United States Patent [19]

Neubert et al.

[11] 4,370,460

[45] Jan. 25, 1983

[54] COPOLYMERS BASED ON STYRENE AND ACRYLIC ACID ESTERS AND/OR METHACRYLIC ACID ESTERS, AND THEIR USE IN GASOLINE-CONTAINING MASONRY PAINTS OR RENDERS

[75] Inventors: Gerhard Neubert, Battenberg; Eckehardt Wistuba, Bad Durkheim, both of Fed. Rep. of Germany

[73] Assignee: BASF Aktiengesellschaft, Rheinlein-Pfalz, Fed. Rep. of Germany

[21] Appl. No.: 274,195

[22] Filed: Jun. 16, 1981

[30] Foreign Application Priority Data

Jun. 21, 1980 [DE] Fed. Rep. of Germany ....... 3023326

[51] Int. Cl.³ .......................................... C08F 220/12
[52] U.S. Cl. ................................ 526/329.2; 428/500; 524/474; 524/558; 524/559; 524/561; 525/214; 526/317; 526/320; 526/321
[58] Field of Search ................. 526/329, 329.2, 321, 526/317, 320

[56] References Cited

U.S. PATENT DOCUMENTS 3,202,625  8/1965  Tess et al. ........................... 524/833
4,165,418  8/1979  Speakman ......................... 526/329.2

FOREIGN PATENT DOCUMENTS 2833468  2/1980  Fed. Rep. of Germany .
988272  4/1965  United Kingdom .
1327530  8/1973  United Kingdom .

*Primary Examiner*—Harry Wong, Jr.
*Attorney, Agent, or Firm*—Oblon, Fisher, Spivak, McClelland & Maier

[57] ABSTRACT

Gasoline-soluble copolymers containing, as copolymerized units, (A) from 10 to 40% by weight of styrene,
(B) from 10 to 50% by weight of tert.-butyl acrylate and/or vinyl pivalate,
(C) from 20 to 40% by weight of isobutyl methacrylate,
(D) from 5 to 20% by weight of acrylic acid esters and/or methacrylic acid esters of alkanols of 10 to 20 carbon atoms and
(E) from 0 to 5% by weight of monoolefinically unsaturated monocarboxylic acids and/or dicarboxylic acids of 3 to 5 carbon atoms and/or their β-hydroxyalkyl esters and/or monoalkyl esters of the dicarboxylic acids, the amount of component (D) being from 20 to 50% by weight of that of component (A), and the sum of the percentages of A to E being 100, are particularly suitable for use as binders for gasoline-containing masonry paints and renders.

1 Claim, No Drawings

COPOLYMERS BASED ON STYRENE AND ACRYLIC ACID ESTERS AND/OR METHACRYLIC ACID ESTERS, AND THEIR USE IN GASOLINE-CONTAINING MASONRY PAINTS OR RENDERS

The present invention relates to copolymers, based on styrene and acrylic acid esters and/or methacrylic acid esters, which exhibit improved solubility in hydrocarbons coupled with increased blocking resistance and which are particularly suitable for use as binders in gasoline-containing masonry paints and renders.

Belgian Pat. No. 623,007 discloses copolymers, especially of vinyltoluene, with acrylic acid esters of alkanols of 8 to 16 carbon atoms. These copolymers are suitable for use as binders for paints and renders. Those of the copolymers which have sufficient blocking resistance, as a result of containing a high proportion of vinyltoluene as copolymerized units, do not have satisfactory weathering resistance, so that paint films produced with these materials yellow rapidly and chalk quickly and severely. Corresponding copolymers which contain styrene as copolymerized units in place of vinyltoluene are, it is true, more resistant to weathering and to yellowing, but their solubility in hydrocarbon solvents of low aromatic content, such as mineral spirit, and/or their blocking resistance, are not entirely satisfactory. Where these copolymers are soluble in mineral spirit at down to below 0° C., they have insufficient blocking resistance in the form of a solid product; they block and cake on storage and must therefore be stored, and transported, in the form of solutions, which adds to the cost.

The range of uses of the conventional styrene copolymers soluble in mineral spirit is furthermore restricted by their incompatibility with most other surface-coating binders. For example, they cannot be combined with hydrolysis-resistant vinyl chloride copolymers or relatively high molecular weight types of chlorinated rubber.

British Pat. No. 1,327,530 discloses the use of homopolymers of isobutyl methacrylate and copolymers of isobutyl methacrylate with acrylic acid esters of alkanols of 6 to 12 carbons atoms as non-blocking binders, soluble in mineral spirit, for masonry paints. However, such copolymers contain relatively small proportions of long-chain esters of acrylic acid as copolymerized units, so that they have to contain relatively high proportions of isobutyl methacrylate, an expensive monomer, as copolymerized units in order to ensure adequate blocking resistance.

A particular disadvantage of copolymeric binders of the above type, which contain neither vinyltoluene nor isobutyl methacrylate as copolymerized units, is that their solutions in gasoline or mineral spirit at below 0° C. generally form two phases, if the copolymers are sufficiently non-blocking. This formation of two phases however interferes with the use of the copolymers as binders for masonry paints and renders, especially if these products are employed at around or below freezing point.

It is an object of the present invention to provide copolymers which give non-blocking films having good weathering resistance and which exhibit improved compatibility with other surface-coating binders, are highly resistant to chemicals which cause hydrolysis, and at the same time, though they only contain a relatively small proportion of isobutyl methacrylate as copolymerized units, have a reduced tendency to form two phases in gasoline solution at from about freezing point down to about −10° C.

We have found, surprisingly, that this object is achieved by copolymers which have a K value, measured according to DIN 53,726, of from 15 to 60 and which contain, as copolymerized units, (A) from 10 to 40% by weight of styrene, (B) from 10 to 50% by weight of tert.-butyl acrylate and/or vinyl pivalate, (C) from 20 to 40% by weight of isobutyl methacrylate, (D) from 5 to 20% by weight of acrylic acid esters and/or methacrylic acid esters of alkanols of 10 to 20 carbon atoms and (E) from 0 to 5% by weight of monoolefinically unsaturated monocarboxylic acids and/or dicarboxylic acids of 3 to 5 carbon atoms and/or their $\beta$-hydroxy ($C_{2-3}$) alkyl esters and/or monoalkyl esters of the dicarboxylic acids, the amount of component (D) being from 20 to 50% by weight of that of component (A), and the sum of the percentages of A to E being 100. The novel copolymers are particularly suitable for use as binders for gasoline-containing masonry paints or renders.

The copolymers themselves are distinguished both by high blocking resistance, so that they can also be readily stored and transported as solids, as well as by excellent solubility in mineral spirit of low aromatic content, even at down to −10° C., so that they can also be readily stored and transported as solids. Using masonry paints and renders, containing the novel copolymers as binders, it is possible to obtain coatings which are particularly hard, heat-resistant and soiling-resistant and at the same time particularly weathering-resistant and yellowing-resistant, and are furthermore distinguished by great resistance to chemicals which cause hydrolysis.

The novel copolymers are readily compatible, and therefore combinable, with many other, conventional, surface-coating raw materials, for example with vinyl chloride copolymers and chlorinated rubbers having viscosities of generally from 4 to 120, especially from 8 to 55, mPa·s, measured by the method of DIN 53,015 on a 20% strength toluene solution.

The novel copolymers can be prepared in a conventional manner, for example by mass polymerization, solution polymerization, emulsion polymerization or suspension polymerization, in the presence of the conventional polymerization initiators, for example organic or inorganic peroxides, at conventional polymerization temperatures, which are in general from 60° to 180° C., preferably from 80° to 140° C. Preferably, the copolymers are prepared by suspension polymerization. The K values of the copolymers are preferably from 25 to 45 (measured on a 3% strength solution in acetone). The copolymers preferably contain from 20 to 40% by weight of styrene, from 20 to 40% by weight of component (B), from 25 to 40% by weight of isobutyl methacrylate, from 5 to 15% by weight of component (D) and from 0 to 3% by weight of component (E) as copolymerized units. Tert.-butyl acrylate is the preferred component (B). Particularly suitable components (D) are the acrylic acid esters and methacrylic acid esters of straight-chain or branched alkanols of 11 to 15 carbon atoms. Specific examples of these are the acrylic acid esters of straight-chain alkanols of 12 to 14 carbon atoms, e.g. lauryl acrylate and myristyl acrylate. Copolymers which contain, as component (D), from 7 to 12% by weight of lauryl acrylate as copolymerized units are of particular interest. The amount of component (D) is preferably from 25 to 35% by weight of the amount of component (A).

The monomers (E) present as copolymerized units in the novel copolymers influence the dispersing action of the copolymers in masonry paints and renders. However, being strongly polar compounds, they reduce the solubility of the copolymers in gasoline. Accordingly, their content is generally the lower, the smaller the particular monomer molecule. It is not essential that the copolymers contain monomer (E), but in many cases a content of from 0.5 to 3% by weight, based on the polymer, is advantageous. Examples of monomers (E) are acrylic acid, methacrylic acid, maleic acid, fumaric acid, β-hydroxyethyl acrylate and methacrylate, β-hydroxypropyl acrylate and methacrylate, N-β-hydroxypropylacrylamide and monoesters of maleic acid or fumaric acid with alkanols of 1 to 18 carbon atoms, e.g. mono-n-butyl maleate, mono-isobutyl maleate, monoethyl fumarate, mono-2-ethylhexyl fumarate, monolauryl maleate and mono-2-ethylhexyl maleate.

Surface-coating agents especially for coating mineral substrates, such as masonry, concrete, mineral render, brick and asbestos cement can be prepared, in the form of masonry paints and renders, from the copolymers according to the invention, in the conventional manner used to prepare physically drying surface-coating agents, with the aid of paint solvents, especially mineral spirit. The conventional plasticizers, pigments and fillers, as well as other surface-coating raw materials and auxiliaries, such as anti-settling agents, thickeners and wetting agents, may additionally be present. Surface-coating agents, such as masonry paints and renders, produced using the novel copolymers as binders can be applied in a conventional manner, for example by roller-coating, spraying or brushing.

In the Examples which follow, parts and percentages are by weight.

EXAMPLE 1

70 parts of styrene, 70 parts of tert.-butyl acrylate, 40 parts of isobutyl acrylate and 20 parts of lauryl acrylate are heated to 100° C. under nitrogen. 1 part of cumene hydroperoxide, dissolved in 2 parts of toluene, is added, whilst stirring, the temperature is raised to 130° C., and a monomer mixture, consisting of 280 parts of styrene, 280 parts of tert.-butyl acrylate, 160 parts of isobutyl acrylate and 80 parts of lauryl acrylate, is added in the course of 4 hours and, starting at the same time, an initiator solution, consisting of 9 parts of cumene hydroperoxide and 18 parts of toluene, in the course of 4½ hours. The mixture is finally polymerized for 1 hour at 140° C. The molten polymer is degassed under reduced pressure at 140°-150° C. The properties of the polymer are shown in the Table given later.

EXAMPLE 2

30 parts of styrene, 35 parts of isobutyl methacrylate, 25 parts of tert.-butyl acrylate and 10 parts of lauryl acrylate are polymerized as described in Example 1. The properties of the polymer are shown in the Table which is given later.

The copolymer is compatible with vinyl chloride/vinyl isobutyl ether copolymers, commercially available under the name ®Laroflex MP, as well as with chlorinated rubber grades with type numbers from 10 to 40, the compatibility being readily demonstrated by, for example, mixing 25% strength solutions in solvent naphtha and then allowing a film, prepared therefrom, to dry.

EXAMPLE 3

30 parts of styrene, 37 parts of tert.-butyl acrylate, 25 parts of isobutyl acrylate and 8 parts of lauryl acrylate are polymerized as described in Example 1. The properties of the polymer are shown in the Table which follows later.

EXAMPLE 4

140 parts of isobutyl methacrylate, 120 parts of styrene, 100 parts of tert.-butyl acrylate, 40 parts of lauryl acrylate and 6.4 parts of benzoyl peroxide are added to a solution of 4 parts of polyvinylpyrrolidone (K value 90) in 1,200 parts of water at 20° C., and then polymerized for 6¼ hours at 80° C., whilst the mixture is being stirred at 300 rpm. The product is then filtered off, washed with water and dried for 20 hours at 40° C. The properties of the suspension polymer obtained are shown in the Table which follows later.

EXAMPLE 5

Masonry Paint

To prepare masonry paint, 100 parts of the copolymer of Example 4 are dissolved in 250 parts of mineral spirit, having a boiling range of 155°-185° C. and containing 17% of aromatics, and 40 parts of chloroparaffin, containing 60% of chlorine, as the plasticizer. The solution is pigmented by grinding with 120 parts of rutile and 550 parts of calcite (0.002-0.2 mm particle diameter) and is at the same time thickened with 5 parts of a thickener based on hydrogenated castor oil, for example the thickener commercially available under the name "Rilanit spezial." The masonry paint can, where appropriate with the addition of further mineral spirit, be used, and stored, at down to about −5° C. without the occurrence of phase separation.

EXAMPLE 6

Render

A masonry render is prepared, by a method similar to that described in Example 5, from 100 parts of the copolymer of Example 4, 50 parts of chloroparaffin, 200 parts of mineral spirit, 150 parts of rutile, 600 parts of calcite (0.05-0.4 mm particle diameter), 200 parts of microcalcite and 8 parts of the same thickener as used in Example 5. The render can, where appropriate with addition of further mineral spirit, be stored, and used, at down to −5° C.

COMPARATIVE EXPERIMENT

A copolymer having the properties shown in the Table which follows is prepared by solution polymerization of 45 parts of styrene and 55 parts of 2-ethylhexyl acrylate in 80 parts of mineral spirit, having a boiling range of 155°-185° C. and containing 18% of aromatics, at 130° C., in the presence of 0.5 part of tert.-butyl perbenzoate.

TABLE

| | Example No. | | | | Comparative experiment |
|---|---|---|---|---|---|
| | 1 | 2 | 3 | 4 | |
| K value (3% strength in acetone) | 35 | 36 | 35 | 33 | 36 |
| Flow time of a 33.3% strength solution in mineral spirit (+), DIN 4 cup, 23° C. | 60 s | 70 s | 60 s | 60 s | 70 s |
| Copolymer is soluble (++) in this solution down to .. °C. | −6 | −10 | −8 | −7 | −3 |
| Softening point, according to DIN 53,180, in °C. | 100 | 102 | 97 | 100 | 57 |
| Blocking resistance | very good | very good | very good | very good | none |
| Surface tack | non-tacky | non-tacky | non-tacky | non-tacky | very tacky |

(+) Contains 18% of aromatics; boiling range 155–185° C.
(++) The copolymer is insufficiently soluble below the stated temperature.

We claim:

1. A benzene-soluble copolymer, having a K value of from 15 to 60, which contains, as copolymerized units,
   (A) from 10 to 40% by weight of styrene,
   (B) from 10 to 50% by weight of tert-butyl acrylate and/or vinyl pivalate,
   (C) from 20 to 40% by weight of isobutyl methacrylate,
   (D) from 5 to 20% by weight of acrylic acid esters and/or methacrylic acid esters of alkanols of 10 to 20 carbon atoms and
   (E) from 0 to 5% by weight of monoolefinically unsaturated monocarboxylic acids of 3 to 5 carbon atoms or their β-hydroxy ($C_{2-3}$) alkyl esters, and/or monoolefinically unsaturated dicarboxylic acids of 3–5 carbon atoms, their β-hydroxy ($C_{2-3}$) alkyl esters or mono-($C_{1-18}$) alkyl esters or mixtures of said monoolefinically unsaturated carboxylic acids or esters, the amount of component (D) being from 20 to 50% by weight of that of component (A), and the sum of the percentages of A to E being 100.

* * * * *